United States Patent
Lee

(10) Patent No.: US 8,029,713 B2
(45) Date of Patent: Oct. 4, 2011

(54) APPARATUS AND METHOD FOR MANUFACTURING VEHICLE DOOR TRIM AND VEHICLE DOOR TRIM MANUFACTURED USING THE METHOD

(75) Inventor: Jongho Lee, Gunpo-si (KR)

(73) Assignee: KIA Motors Corporation, Seoul (KR)

( * ) Notice: Subject to any disclaimer, the term of this patent is extended or adjusted under 35 U.S.C. 154(b) by 13 days.

(21) Appl. No.: 12/244,575

(22) Filed: Oct. 2, 2008

(65) Prior Publication Data
US 2009/0152769 A1 Jun. 18, 2009

(30) Foreign Application Priority Data
Dec. 15, 2007 (KR) .................. 10-2007-0131738

(51) Int. Cl.
*B28B 7/22* (2006.01)
(52) U.S. Cl. ...................................... 264/255
(58) Field of Classification Search .............. 264/294, 264/255; 425/588, 130
See application file for complete search history.

(56) References Cited

U.S. PATENT DOCUMENTS
| | | |
|---|---|---|
| RE37,506 E | 1/2002 | Morita |
| 2003/0122272 A1* | 7/2003 | Smith et al. ............ 264/40.1 |
| 2008/0079191 A1* | 4/2008 | Nishida ................. 264/255 |

FOREIGN PATENT DOCUMENTS
| | | |
|---|---|---|
| JP | 4-339617 A | 11/1992 |
| JP | 6-285907 A | 10/1994 |
| JP | 2004-130650 A | 4/2004 |
| KR | 10-2006-0128760 A | 12/2006 |
| KR | 10-0706424 B1 | 4/2007 |

* cited by examiner

*Primary Examiner* — Christina Johnson
*Assistant Examiner* — Larry Thrower
(74) *Attorney, Agent, or Firm* — Morgan, Lewis & Bockius LLP

(57) ABSTRACT

A first mold has a core passage, and first and second cavities in fluid communication with each other at the core passage. A second mold has first and second nozzles therein that inject first and second resins to the first and second cavities, respectively. The core member is slidable within the core passage to provide or block the fluid communication between the cavities, and has a third nozzle therein to inject a third resin to the core passage. The first and second resins are injected into the cavities. The core member is moved to block the fluid communication between the cavities, before injecting the first and second resins is completed. The third resin is injected while moving the core member to provide the fluid communication, after injecting the first and second resins is completed. The molds are separated, thereby yielding a single molded product, such as a vehicle door trim.

3 Claims, 2 Drawing Sheets

APPARATUS AND METHOD FOR MANUFACTURING VEHICLE DOOR TRIM AND VEHICLE DOOR TRIM MANUFACTURED USING THE METHOD

CROSS-REFERENCE TO RELATED APPLICATIONS

The present application is based on, and claims priority from, Korean Application Serial Number 10-2007-0131738, filed on Dec. 15, 2007, the disclosure of which is hereby incorporated by reference herein in its entirety.

FIELD OF THE INVENTION

The present invention relates to a vehicle door trim, and to an apparatus and method for manufacturing the trim.

BACKGROUND OF THE INVENTION

A typical vehicle door includes an inner and an outer panel, welded to each other at several positions where the panels overlap. The door also includes a trim fastened to the inner panel, such as with clips.

A typical trim is made of injection molded plastic in several pieces, e.g. an upper trim, a lower trim, a central trim, an inside handle garnish, and the like, which are then thermally bonded or screwed together. This is time consuming and may require several injection molding machines.

The above information disclosed in this Background section is only for enhancement of understanding of the background of the invention and therefore it may contain information that does not form the prior art that is already known in this country to a person of ordinary skill in the art.

SUMMARY OF THE INVENTION

An apparatus includes first and second molds and a core member. The first mold has therein a core passage, and first and second cavities in fluid communication with each other at the core passage. The second mold has first and second nozzles disposed therein that inject first and second resins to the first and second cavities, respectively. The core member is slidable within the core passage to provide or block the fluid communication between the cavities, and has a third nozzle therein to inject a third resin to the core passage. The apparatus may also include a heater near the core passage to heat the resins. The core member may include a core body with the third nozzle therein; and a core plug at an end of the core body, to block the fluid communication between the cavities.

In a method, first and second resins are injected into first and second cavities in a first mold, through first and second nozzles, respectively, while the first mold and a second mold are closed. The first and second cavities are in fluid communication with each other at a core passage in the first mold. A core member is moved within the core passage to block the fluid communication between the cavities, before injecting the first and second resins is completed. A third resin is injected through a third nozzle in the core member while moving the core member to provide the fluid communication between the cavities, after injecting the first and second resins is completed. The first and second molds are separated after a cooling time, thereby yielding a single molded product, such as a vehicle door trim. The resins may further be heated during injecting of the third resin. The first and second resins may be different colors.

BRIEF DESCRIPTION OF THE DRAWINGS

For a better understanding of the nature and objects of the present invention, reference should be made to the following detailed description with the accompanying drawings, in which.

DETAILED DESCRIPTION OF PREFERRED EMBODIMENTS

Preferred embodiments of the present invention will be described below with reference to accompanying drawings.

Figure 1:
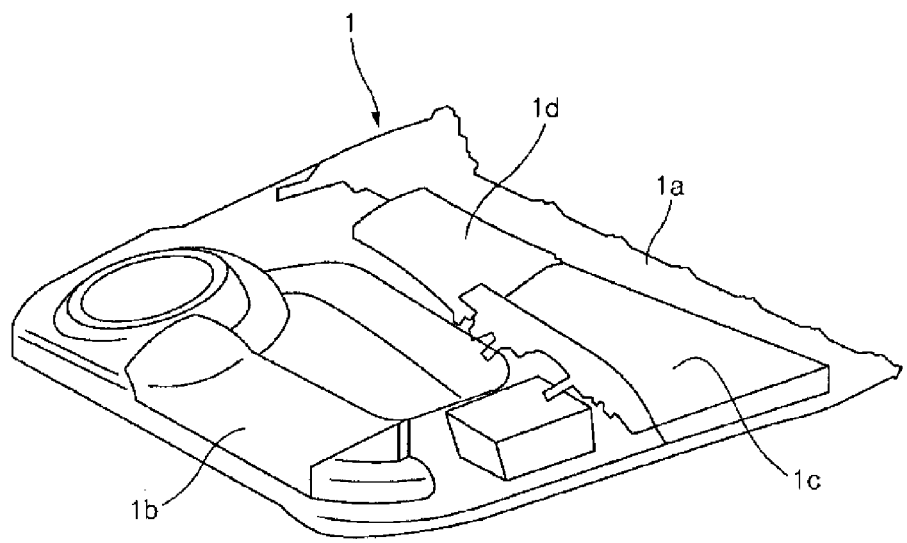
FIG. 1 is a perspective view of an exemplary door trim.

As shown in FIG. 1, a plastic, injection molded vehicle door trim 1 includes several pieces, such as an upper door trim 1a, a lower door trim 1b, a central door trim 1c, and a door inside handle garnish 1d. Two or more of these pieces may be made simultaneously using one mold.

Figure 2:
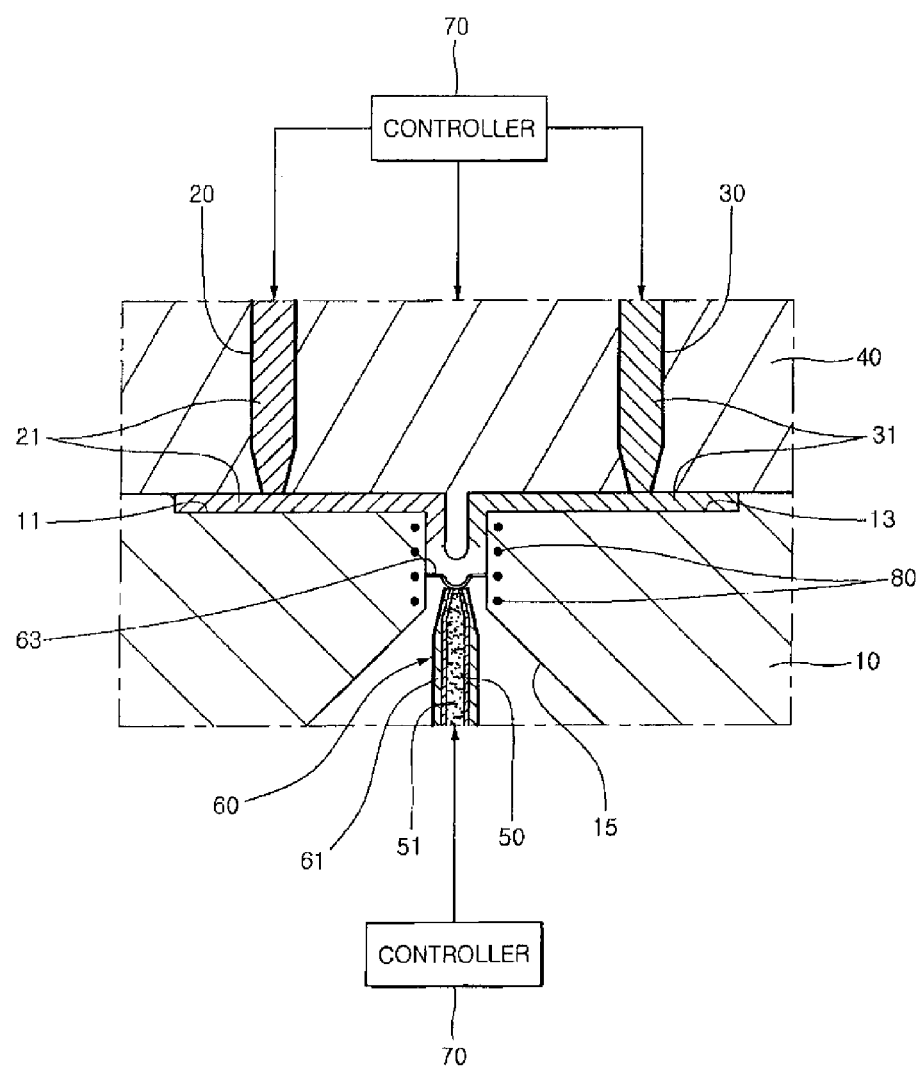
FIGS. 2 to 4 are cross-sectional views illustrating an exemplary apparatus and method for manufacturing the door trim of FIG. 1.

Referring to FIG. 2, an apparatus for manufacturing the door trim includes a stationary mold 10, a movable mold 40, a core member 60, a controller 70, and a heater 80.

A first cavity 11 and a second cavity 13 are defined on stationary mold 10, adjacent to each other. The inner ends of both cavities 11 and 13 are open. A core passage 15 in stationary mold 10 fluidly connects the open ends of the cavities 11 and 13.

First and second nozzles 20 and 30, which are used to inject first and second molten resins 21 and 31 (which may, for example, have different colors) to first and second cavities 11 and 13, respectively, are provided in movable mold 40.

Core member 60 slides along core passage 15 to close the open ends of the cavities 11 and 13.

A third nozzle 50, in core member 60, injects a third molten resin 51. For this purpose, core member 60 includes a core body 61 and a core plug 63. The core body slides along core passage 15 without interfering with stationary mold 10, and is integral with third nozzle 50. The core plug is provided at an end of core body 61, and moves along core passage 15 to close the open ends of the cavities 11 and 13 while the outer peripheral surface of the core plug is in airtight contact with core passage 15.

Heater 80 is provided on the side of core passage 15. Heater 80 may include a heating coil surrounding core passage 15. The heater 80 is operated by electrical power that is supplied according to the control of controller 70, and simultaneously preheats first to third molten resins 21, 31, and 51 so that third molten resin 51 is evenly mixed with first and second molten resins 21 and 31 and connects first molten resin 21 with second molten resin 31.

Controller 70 controls the operation of movable mold 40, first to third nozzles 20, 30, and 50, and core member 60. Further, the controller controls the supply of electrical power to heater 80.

An exemplary method of manufacturing a vehicle door trim will be described below with reference to FIGS. 1 to 4.

When stationary mold 10 and movable mold 40 are closed as shown in FIG. 2, first and second molten resins 21 and 31 are simultaneously injected into first and second cavities 11 and 13 through first and second nozzles 20 and 30.

Until the injection of first and second molten resins 21 and 31 is completed, core member 60 is positioned below core passage 15 as shown in FIG. 2.

Figure 3:
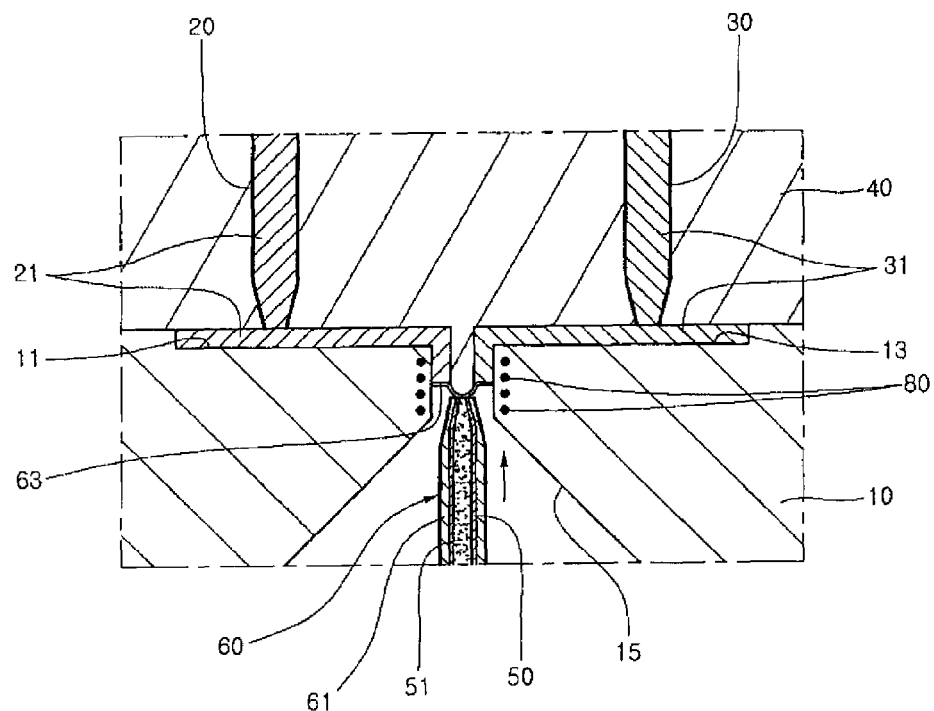

Immediately before the injection of first and second molten resins 21 and 31 is completed, core member 60 is moved upward along core passage 15 as shown in FIG. 3 and simultaneously closes up the opened ends of first and second cavities 11 and 13 by using core plug 63.

Figure 4:
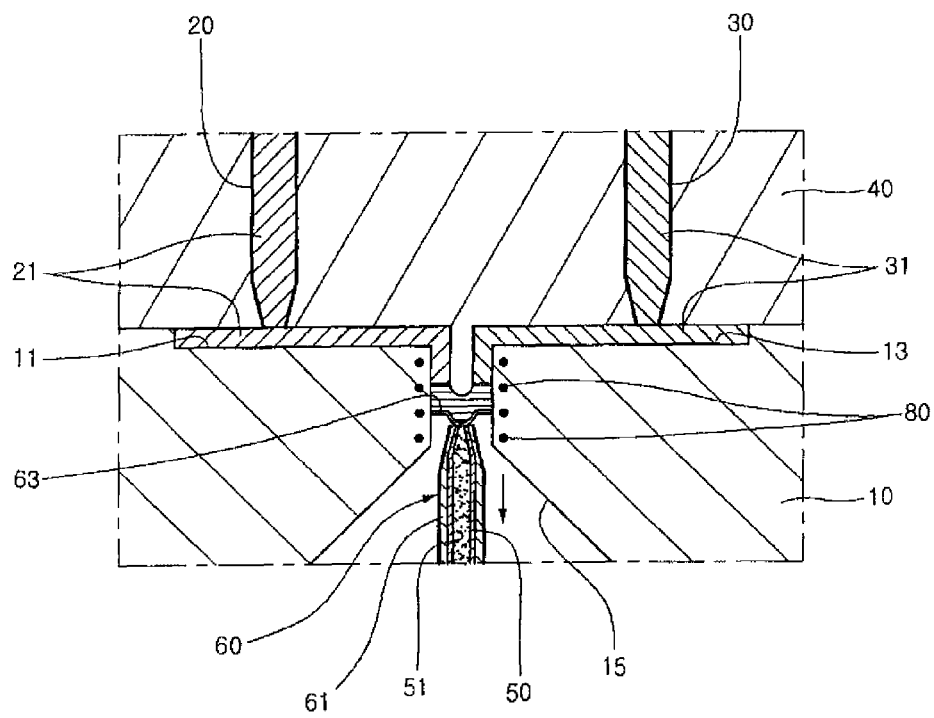

Then, core member 60 gradually moves downward as shown in FIG. 4, while simultaneously injecting third molten resin 51 through third nozzle 50, which mixes with first and second molten resins 21 and 31 as they flow out from the open ends of first and second cavities 11 and 13. Heater 80 then heats the molten resins 21, 31, and 51 so that third molten resin 51 is evenly mixed with first and second molten resins 21 and 31 and connects first molten resin 21 with second molten resin 31.

Stationary mold 10 and movable mold 40 are then separated from each other after a predetermined cooling time. Then, a worker pulls out the molded product from first and second cavities 11 and 13.

The product includes two parts integrally connected without the need for a separate assembly member or process. For example, one product may include an upper door trim 1*a* and a lower door trim 1*b*, which may be different colors. Another product, including a central door trim 1*c* and a door inside handle garnish 1*d*, may be made by the same method, and thermally bonded or screwed with the first product (upper door trim 1*a* and lower door trim 1*b*).

Alternatively, all four parts may be molded together by the method, by simple modifications to the described embodiments that will be apparent to those of ordinary skill in the art, based on the teachings herein.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method, comprising:
    simultaneously injecting first and second resins into first and second cavities disposed in a first mold, through first and second nozzles, respectively, while the first mold and a second mold are closed, wherein the first and second nozzles supply the first and second molten resins independently to each of the first and second cavities and wherein a core passage is disposed downstream the first and second cavities to receive the first and second resins flowing therein;
    moving a core member within the core passage to block a fluid communication between the downstream portions of the first and second cavities, before injecting the first and second resins is completed;
    injecting a third resin through a third nozzle formed in the core member while moving the core member to provide the fluid communication of resins between downstream portions of the first and second cavities after injecting the first and second resins is completed to mix the first, second and third molten resin in the core passage; and
    separating the first and second molds after a cooling time, thereby yielding a single molded product.

2. The method as defined in claim 1, further comprising heating the resins during injecting of the third resin.

3. The method as defined in claim 1, wherein the first and second resins comprise different colors.

* * * * *